United States Patent [19]

Chapman et al.

[11] Patent Number: 4,493,781

[45] Date of Patent: Jan. 15, 1985

[54] POWDERED CLEANSING COMPOSITION

[75] Inventors: Francis E. Chapman; Robert B. Harris, both of Racine County, Wis.

[73] Assignee: S. C. Johnson & Son, Inc., Racine, Wis.

[21] Appl. No.: 251,564

[22] Filed: Apr. 6, 1981

[51] Int. Cl.$^3$ .................................... C09K 3/22

[52] U.S. Cl. .................................... 252/88; 8/137; 252/174.25; 252/90

[58] Field of Search .................... 252/179, 88, 163; 8/137, 142

[56] References Cited

U.S. PATENT DOCUMENTS

| | | | |
|---|---|---|---|
| 2,165,586 | 7/1939 | Studer | 252/163 |
| 2,344,247 | 3/1944 | Hopkins | 252/163 |
| 3,418,243 | 12/1963 | Hoxie | 252/154 |
| 3,630,919 | 12/1971 | Sheaffer | 8/137 |
| 3,827,857 | 8/1974 | Boulus | 8/137 |
| 4,083,193 | 4/1978 | Jakobi | 8/137 |
| 4,244,834 | 1/1981 | Schwalley | 252/88 |
| 4,248,728 | 2/1981 | Puryear | 252/179 |
| 4,304,675 | 12/1981 | Corey | 8/142 |

*Primary Examiner*—Sam Silverberg

[57] ABSTRACT

A carpet cleaning composition adapted to be sprinkled on and vacuumed off a soiled carpet includes an aqueous volatile solvent, an inert highly-absorbent carrier and a natural or synthetic aluminosilicate zeolite.

8 Claims, No Drawings

POWDERED CLEANSING COMPOSITION

BACKGROUND OF THE INVENTION

1. Field of the Invention

This invention relates to a composition for cleaning textile fabrics. In particular it relates to a powdered carpet cleaning composition which is easily applied and readily removed.

2. Description of the Prior Art

Commercially available liquid compositions such as carpet or rug shampoos, specifically adapted for cleaning formed textiled fabrics, exhibit well known defects which render them unacceptable to many consumers. Such liquid cleansers tend to cause shrinking, wicking and matting of textile fabrics, such as carpeting. In addition, such compositions characteristically leave sticky, tacky deposits such as detergent residues, which enhance the tendency of the carpet to accumulate additional soil. To avoid detergent residues, it is usually necessary to observe a protracted drying interval prior to the resumption of traffic after application of the liquid composition. Such liquid compositions can also give rise to mildew formation and can damage metallic articles in contact with carpeting.

Proposals have been made to overcome the defects of liquid carpet cleaning compositions by employing dry carpet cleaning compositions. In general, prior art dry cleaning compositions are formulated to be applied to the carpet, thereafter to be rubbed or scrubbed into the pile or nap with a brush or the like and, after drying, to be removed from the pile by vacuuming. Unfortunately, the dry prior art compositions do not satisfy the long recognized criteria for acceptable carpet maintenance.

A satisfactory product should be readily applied to carpeting, preferably in a free flowing powdered form, which is relatively dry to the touch. For most cleaning purposes it should not be necessary to work the composition into the nap, since this procedure is inconvenient, taxing and unduly delays the cleaning process. The cleaning composition, if damp to the touch, should rapidly dry and be easily removed by vacuuming or the like. The dry composition should be free from the tendency to form dust clouds upon application. The composition should be nontoxic and compatible with natural and synthetic textile materials. The cleaner should provide the carpeting with a capacity to resist soiling for substantial periods even after the composition is removed.

Most importantly, the dry composition should be a highly effective carpet cleaner with a capacity to remove deep-seated carpet residues and to impart softness to the carpet after treatment. The composition should substantially, if not totally, eliminate the traffic patterns often found on heavily utilized rugs and carpets. Until now, there has not been available a dry carpet cleaner and maintainer, which can meet this broad spectrum of requirements.

In U.S. Pat. No. 3,240,713 there is disclosed a cleaning composition which is characterized as a wet, wood flour product formed by combining a treated wood flour, an oxidizing bleaching agent, water, a volatile, low boiling solvent, an organic emulsifier and an alkaline detergent salt. This composition appears to be a soggy mass, which must be worked into the carpet pile by rubbing or scrubbing it into the nap.

In U.S. Pat. No. 3,418,243 there is disclosed a dry cleaning composition for carpets containing a surfactant, a hydrocarbon solvent, a detergent and an absorbent material. This composition is designed to be worked or brushed into the carpet with a suitable applicator and to be removed by vacuuming or the like. This formulation admittedly relies primarily upon the action of the water-to dissolve water soluble soil and of the solvent-to dissolve oils and greases in the carpet. As such, it lacks the capacity to remove substantial quantities of insoluble residue and deep-seated carpet soil.

Another approach to carpet cleaning is disclosed in U.S. Pat. No. 3,827,857. A putty or paste-like material containing detergent, an organic solvent, an absorbent and water is applied to a backing material to form a composite cleaning pad. This pad is then applied to a carpet and, after 3 to 36 hours, it is removed. This is a slow expensive and inconvenient method for cleaning carpeting.

A dry carpet cleaning composition containing from 0.1% to 8% colloidal silica, an absorbent material and water, is disclosed in U.S. Pat. No. 3,630,919. Colloidal silica is especially dusty and difficult to handle. Even in such minor amounts, it normally requires the use of a dust suppressant. Although it is possible to apply this composition to the carpeting and, after standing, to remove it, nevertheless in order to obtain optimum cleansing effects, the product must be vigorously scrubbed into the carpet surface, using powered mechanical devices, such as rotary brushes and the like.

Other various and sundry powdered carpet compositions are available to eliminate odors from carpets. Such deodorizing formulations, as disclosed in U.S. Pat. No. 4,161,449, lack practical carpet cleaning properties.

None of the prior art dry, carpet cleaning compositions have satisfied the need for a sprinkle on, vacuum-off composition having a specific high affinity for carpet soil which will remove substantial quantities of carpet residues without the need for vigorous scrubbing and which will render carpeting appreciably softer and resistant to soiling and traffic build-up after removal.

SUMMARY OF THE INVENTION

While the composition of the invention is useful for treating textile fibers or fabric it will be referred to hereafter in its preferred form as a carpet cleaner and maintainer. The above and other advantages are attained in particulate carpet cleaning compositions which have a high affinity for carpet soil which is normally resistant to vacuum removal. The composition is adapted for distribution without dusting to either natural or synthetic carpeting and is expeditiously removed, therefrom. The composition includes an aqueous volatile solvent in sufficient amounts to control dusting and to provide uniformity in the composition. An inert, highly absorbent carrier is provided in sufficient amounts to form a central wetted core to cooperate in removing carpet soil. A natural or synthetic aluminosilicate zeolite is provided in sufficient amounts of effectively remove carpet soil in cooperation with the carrier and volatile solvent. The zeolite is formulated to become anchored to the central core of the particle to resist the tendency to dust upon application.

It has been found that the zeolite, in cooperation with the carrier and volatile solvent, exhibits a high affinity for carpet soil and quickly and efficiently lifts and removes the soil after application. The composition has a low dusting tendency, is compatible with natural and synthetic carpets, rapidly dries upon application and provides the carpet with soil resistant properties and traffic pattern resistant properties after treatment.

The composition of the invention is preferably a free flowing, finely divided powder which is slightly moist to the touch upon application. The solvent volatilizes after application to the carpet and the resulting powder is readily removed by vacuuming or sweeping.

A volatile organic solvent may be employed to augment or replace in part, the aqueous portion of the solvent. If desired, a brightener, such as precipitated calcium carbonate, is also utilized in the inventive composition. The zeolite can also be supplemented with a dry, hydrated colloidal silica, under appropriate circumstances.

DESCRIPTION OF PREFERRED EMBODIMENTS

The aqueous, volatile solvent employed in the present invention assists in loosening water soluble soil present in the carpet to be treated. The aqueous solvent can be water, present either as tap water or as deionized water. If desired, in order to enhance the capacity of the composition to dissolve greases and oils, an organic solvent may be employed to supplement the aqueous solvent. The organic solvent should be a non-oily type and completely volatile at room temperature so it may be removed by evaporation. The organic solvent should be reasonably free from flash and fire hazard, nontoxic, and nonharmful to the materials of the carpet fabric or backing.

The organic solvent generally should have an initial boiling point in the range from 300° F. to 340° F., a flash point of 100° F. and a distillation end point in the range of 380° F. to 470° F. Specific examples of solvents which can be employed are petroleum distillates; chlorinated hydrocarbons; such as 1,1,1-trichloroethane and perchloroethylene; glycol ethers, such as ethylene glycol monobutylether, and the like; alkyl phthalates, mineral oils; ethoxylated alcohols; vegetable oils mineral spirits, and mixtures thereof.

The most preferred organic solvent is a glycol ether, especially propylene glycol methylether.

Unless otherwise indicated all amounts are in percent by weight of the total composition.

In general, the aqueous volatile solvent is employed in amounts from about 5 to 50% and preferably from about 15 to 30% by weight. If the liquid phase is increased beyond about 50% by weight, the composition becomes excessively agglomerated and difficult to handle and apply. If the liquid phase is reduced below about five percent by weight, the product is unduly dry and powdery and dusting may become a serious problem. In addition, the cleaning properties of the composition are adversely effected.

In general, the organic volatile solvent is employed in amounts from about 0 to 10%. The preferred volatile solvent comprises from about 15 to 30% water and from about 3 to 7% organic solvent.

The inert highly absorbent carrier material is usually of a neutral coloration, for example, white or gray, in order to allow the user to discern the extent of the carpet area being treated. In addition, the user is able to observe the color changes of the particles as the composition picks up soil from the carpet during cleaning.

It has been postulated that the absorbent material is wetted by the volatile solvent and forms a central core to which the zeolite become anchored. It has been found that it is beneficial to provide a high surface area for the cleaning composition. Accordingly, the absorbent material is preferably in the form of a fiber. For best results the fiber is on the order of about 100 to 140 microns in average length. In general, the bulk density of the absorbent material should be on the order of about 6 to 22 pounds per cubic foot to provide optimum absorbent characteristics.

Specific examples of inert carrier materials employed in the present invention include calcined, uncalcined and flux calcined diatomaceous earth, saw dust, talc, triturated cork, corn cob, fuller's earth, montmorillonite clays and the like and mixtures thereof. Another especially useful carrier material is diatomaceous silica. Enhanced results are obtained, and, accordingly, it is preferred to employ cellulose fibers, such as cellulose wood flour and ground textile fiber, such as ground wool or ground cotton fiber. The particularly preferred absorbent is ground wood pulp and wood fibers from 100 to 140 microns in length.

For the purposes of this invention, from about 10 to 95% of the inert carrier is employed. If amounts beyond these are employed, then less satisfactory cleaning properties are obtained. Enhanced results are obtained and accordingly, it is preferred, to employ from about 25 to 40% of the inert carrier material.

The natural or synthetic aluminosilicates of the present invention are amorphous and crystalline aluminosilicates capable of entrapping and collecting carpet soil, including organic residues and such diverse contaminants, as dog hair. Although there are in the order of 34 species of zeolite minerals and about 100 types of synthetic zeolites, only a relative few have practical significance. The practical zeolites are useful as molecular sieves. As such, they should not be permeated by small channel systems which are not interpenetrating. They should not possess a partially collapsed framework structure. The characterization and identification of complex synthetic aluminosilicates has been hampered by the lack of a widely acceptable system of chemical nomenclature. For the most part, synthetic zeolites are identified by an arbitrary industrial code, as found, for example in the text, *Zeolite Molecular Sieves*, by Donald W. Breck, published by John Wiley & Sons, 1974.

The preferred zeolites include those having the chemical oxide formula: $Na_2O\ Al_2O_3\ xSiO_2\ yH_2O$, wherein X is 2 and y/x is from about 1-5. These compounds include Zeolite Y, Zeolite A and Zeolite X. Zeolite A has the typical oxide formula $Na_2O\ Al_2O_3\ 2SiO_2\ 4\ 5H_2O$; Zeolite X has the typical oxide formula $Na_2O\ Al_2O_3\ 2.5\ SiO_2\ 6H_2O$; while Zeolite Y has the typical formula $Na_2O\ Al_2O_3\ 4.8SiO_2\ 8.9H_2O$. Mixtures of such zeolites may be employed, if desired.

Preferred zeolites are commercially available from suppliers who have made only limited proprietary information available to the art. The most useful zeolites include "13X", available as Type 13X from Linde or Davison, having structure type X and a pore size of 10 Angstroms; "4A", available as Type 4A from Linde or Davison, having structure Type A and a pore size of 4 Angstroms; Zeolite NaX, and, most preferably, Zeolite NaA, available as Linde ZB100, Linde ZLB1000, both supplied by Union Carbide and Zeolex 23A from J. M. Huber Co.

The zeolites are used in amounts from about 15 to 90% by weight. Employing greater than about 90% zeolites provides a composition which tends to be unduly dusty on application. Utilizing less than about 15% zeolites normally results in unsatisfactory carpet cleaning properties for the composition. For best results from about 20 to 50% of zeolite is employed.

Depending upon the nature and type of textile fabric or fiber to be treated, various ancillary agents or adjuvants, including brighteners and fillers, can be employed to intensify the appearance and uniformity of the treated substrate. Typical brighteners include alumina, alumina hydrate, talc, magnesium silicate and such clays as bentonite, kaolin and the like. The preferred brighteners are light colored, especially precipitated calcium carbonate.

The brighteners are employed in amounts from about 0 to 30%; amounts beyond about 30% tend to whiten and streak carpeting. Preferably from about 5 to 15% brightener is employed.

Depending upon intended use for the composition of the invention it may be desirable to substitute a filler material for a portion of the solid zeolite or absorbent carriers of the invention. It has been found that smectite clays, which can be described as expandable, three-layered clays, are useful in this respect. These clays include sodium and calcium montmorillonites, sodium saponites and sodium hectorites. Such clays are disclosed in detail in U.S. Pat. No. 3,936,537, issued Feb. 3, 1976, the disclosure relating to the smectite clays being incorporated herein by reference.

If desired, the zeolites may be augmented with, or a portion substituted by, a dry, hydrated colloidal silica. These compounds are different from the colloidal silicas disclosed in U.S. Pat. No. 3,630,919. The hydrated colloidal silicas are formed by processing acidified sodium silicate (silic acid) into a finely divided (silica gel) colloidal form.

As applied herein, the term "zeolite" is meant to include the natural or synthetic zeolites of the invention alone or augmented with a minor proportion of a hydrated colloidal silica. "Alumino-Silicate" is frequently used to describe zeolites. They are characterized for their ability to complex cations.

In order to assure quality performance, the solid ingredients of the present compositions should be employed in particle sizes which allow ready application to the substrate to be treated and expeditious removal therefrom. For this and other purposes the particle size of the zeolite is preferably from about 10 millimicrons to 5 microns; the particle size of the absorbent organic carrier is from 10 to 200 microns and the particle size of the solid adjuvants or other additives employed is from about 10 to 100 microns.

Organic absorbents, e.g., cellulose and wood fiber, are highly absorbent even in large particle sizes. This is not true if the absorbent is inorganic. For example, a diatomaceous silica type absorber needs to be very fine in particle size to develop maximum surface area, a property that is already inherent in a filamentous organic fiber, regardless of particle size.

Other conventional adjuvants and additives typically employed in the practice of the invention include fragrances, anti-static compounds (anti-stats), preservatives, germicides, insecticides and the like. The fragrances employed may be selected from the broad range of essential oils and aromatic chemicals typically employed in such compositions. Antistatic properties may be imparted to the composition of the invention by certain of the various adjuvants utilized herein.

The amount of the optional ingredients employed to add or augment one or more desired properties of the composition is in accordance with recommended practices in this art. In general, such ingredients are used in small amounts, usually less than about one percent by weight of the composition. Other optional ingredients may be employed in addition to those specifically enumerated herein, so long as such ingredients do not impair the properties and characteristics of the present composition.

The compositions of the present invention are particularly and beneficially adapted for use in the cleansing of formed textile fabrics and fibers including pile fabrics of the type knitted or woven principally into yarns or fibers. In particular, they are preferably employed for cleaning heavy, durable fabrics having a nap or pile of the type which, in the ordinary course of events, would not be subjected to dry cleaning. The compositions are particularly useful in the treatment of rugs and carpets.

The formed textile fabric may be of vegetable, synthetic or animal origin, including mixtures thereof. Typical synthetic fabrics which may be beneficially treated by the present composition include viscose rayon, acetate rayon, polyamide, polyester polyolefin and acrylic. Specific examples of polyester fibers which are particularly benefited by the present invention include Dacron and Zephran fibers. Acrylic type fibers which can be beneficially treated include, for example, Creslan, Acrilan, Orlon and the like. Other fibers of a vegetable or animal origin which can be treated include cotton, jute, ramie, wool and the like.

Any conventional blending technique may be utilized which will result in a cleaning particle in which the zeolite is attached to a wetted absorbent substrate. The preferred blending sequence involves initially mixing the aqueous volatile solvent and inert absorbent carrier, employing simple, conventional mixing equipment. Such equipment can be a Hobart Kitchenaide Mixer, a Patterson-Kelly "V" shaped twin-shell blender, a screw mixer and the like.

Next, the zeolite is added to the solvent and carrier. The solvent-saturated absorbent material forms a moist nucleus around which the aluminosilicate attaches or anchors. Thereafter the brightener, filler and other ancillary solid adjuvants or additives are added to the mix. Finally a volatile organic solvent, if employed, and the fragrance and other optional liquids are added. This final liquid addition tends to bind the resultant cleaning particle and to provide a cleaning composition having a uniform particulate nature.

A typical composition of the invention prepared according to the above noted mixing sequence is:

| Ingredient | Weight Percent |
|---|---|
| Cellulose fiber | 32 |
| Water | 23 |
| Aluminosilicate Zeolite | 45 |
| Total | 100 |

The compositions of the present invention are specifically designed for use in both cleaning and maintaining textile fabrics, such as carpeting. They are particularly useful as vacuuming aids to prevent build-up of carpet soil. In practice, the cleaning composition is applied to the surface, allowed to stand and thereafter removed by vacuuming or the like.

The composition may be applied to the carpet by sprinkling from a shaker type container or through the use of any conventional particulate dispensing means. In general, the product is distributed at a spreading rate of from about 2-4 grams per square foot. The spreading rate is varied within this range depending upon the degree of soiling encountered. In severe cases, more than one application may be necessary.

In general, the distributed composition is allowed to stand for periods of time consonant with efficacious cleansing. Depending upon the extent of the cleansing problem to which the user is confronted, the composition will remain on the carpet for a period no less than about several minutes to no greater than about two hours. This period should be sufficient to effectively negotiate the broad range of cleansing problems normally encountered. For most purposes it will be sufficient for the composition to remain in contact with the carpet for from about five to thirty minutes.

The progress and extent of the cleansing action can be observed by noting the color change which occurs in the cleanser compositions based, in part, upon the make-up of the carpet soil. The cleansing composition is thereafter readily and easily removed by sweeping or vacuuming. The treated carpet surface is thereupon ready for immediate resumption of traffic. There is no additional drying period required after normal application and vacuum removal.

For certain very severe carpet soiling problems, such as coffee stains and the like, it may be useful to work the composition into the carpeting by either manual or mechanical means.

It is a distinct advantage of the present invention that unlike prior art carpet cleaning compositions, no manual or mechanical rubbing is required to remove carpet soil. The attractive forces within the composition of the invention perform the work which would otherwise require that a carpet cleanser be rubbed or scrubbed into the nap prior to vacuuming. The present invention typically removes an additional 20 percent or more carpet soil from a carpet which has already been vacuumed. Not only does the present invention provide enhanced carpet cleaning, but it provides the carpet with soil-resistant properties. In normal use a small percentage of product, on the order of one to five percent, will remain firmly anchored in the carpet nap and will function as a soil resisting agent.

While the invention has been previously described in the context of a composition which is manually dispensed from a container or the like, it is within the scope of the invention to employ other dispensing means including a manual pump or a pressurized dispensing means. Additionally, it is within the scope of the invention to employ the composition for general textile fabric cleaning functions, including spot removal and the like.

If the composition of the present invention is to be dispensed from a pressurized container, it is preferred to adjust the relative amounts of aqueous volatile solvent, inert carrier and aluminosilicate as shown below:

| | |
|---|---|
| Aqueous Solvent | 50-98.9% by weight |
| Inert Carrier | 0.1-5% by weight |
| Aluminosilicate | 1-40% by weight |

The composition also will require from 4 to 30% by weight propellent. Preferred propellents include isobutane, propane, N-butane and mixtures thereof. The composition may include a small amount, 0 to 10%, of a surfactant to give a foam tracer. The surfactant, such as sodium lauryl sulfate, ammonium lauryl sulfate and mixtures does not substantially affect the cleaning power of the composition.

The preferred cleaning composition will generally exhibit an agglomerated, substantially dust-free appearance so that it may be readily applied to carpeting. If necessary, the product can be screened to remove undesirable fines and/or lumps.

The following examples serve to illustrate certain preferred embodiments of the invention and are not limitive of scope:

EXAMPLE 1

A powdered cleaning composition of the invention is prepared as follows:

Into a Hobart Food Mixer are charged water and cellulose floc having an average fiber length from about 100–140 microns. The ingredients are mixed until a uniform mass is obtained with minimum clumping. Thereafter, a zeolite of a particle size from 25 to 35 millimicrons is slowly added to the Mixer. During the addition of the zeolite mixing is continued at a slow, uniform rate. Next, precipitated calcium carbonate having a particle size of about one micron is added with continued mixing. Finally, a solvent and fragrance are added under slow mixing until a uniform, free-flowing product is formed.

The product is collected and a portion is introduced into a shaker-type container. The composition is applied at a spreading rate of 2 to 4 grams per square foot to a soiled carpet, allowed to stand in contact with the carpet for about five minutes and thereafter vacuumed off.

The carpet cleaning composition formed has the following composition:

| Ingredients | Weight Percent |
|---|---|
| Cellulose Fibers[1] | 32 |
| Zeolite[2] | 30 |
| Precipitated Calcium Carbonate[3] | 10 |
| Solvent[4] | 5 |
| Water | 23 |
| Total | 100 |

[1]Solka Floc SW 40 supplied by the Brown Company.
[2]Zeolex 23A supplied by J. M. Huber Company.
[3]Albaglos supplied by Pfizer.
[4]Propylene glycol methyl ether, supplied as Dowanol PM by Dow Chemical.

This composition provides superior cleansing properties while imparting to the carpet surface, high resistance to soiling and high resistance to traffic pattern build-up. The carpeting is dry to the touch after treatment and is free from tacky deposits.

EXAMPLE 2

A carpet cleaning composition was prepared substantially in accordance with the procedure set forth in Example 1 having the following composition:

| Ingredients | Weight Percent |
|---|---|
| Cellulose Fibers[1] | 32 |
| Zeolite[2] | 40 |
| Solvent[3] | 5 |
| Water | 23 |
| Total | 100 |

[1]Solka Floc SW 40 supplied by the Brown Company.
[2]Zeolex 23A supplied by J. M. Huber Company.
[3]Propylene glycol methyl ether, supplied as Dowanol PM by Dow Chemical.

The composition is applied to the surface of soiled carpeting by sprinkling it from a shaker can. The product is allowed to stand for five minutes and is thereafter removed by vacuuming.

When applied to a dark textile fabric it is observed that there is no ghost background with this composition, as sometimes occurs when precipitated calcium carbonate or other brighteners are employed in significant quantities. The composition is highly effective in removing carpet soil and preventing both re-soiling and traffic patterning.

When other natural or synthetic zeolites of the present invention are substituted for the Zeolex 23A, such as Type 13X, 4A, NaX and the like, similar results are obtained. Further, when other highly absorbent carriers are sustituted for the cellulose floc, such as wood fibers, wood flour, ground textile fiber and the like, similar results are obtained.

EXAMPLE 3

In order to assess the cleaning effect of the compositions of the present invention, the composition of Example 1 was tested under actual living conditions. Test Carpet A covered two rooms of average size and one hallway of a home. The test carpet was subjected to normal traffic in the two rooms, while heavy traffic caused deep seated soiling in the carpeting laid in the hallway. The carpeting was a relatively difficult to clean nylon of medium pile in a multi-shaded green color.

The test was conducted as follows: The two rooms and hallway were vacuumed employing a Hoover Concept One vacuum cleaner. Thereafter 100 grams of dirt were collected in a disposable collection vacuum bag inserted just before the test. Thereafter, the carpet was subjected to a second vacuuming and an additional 30 grams of dirt were collected.

Next, 600 grams of the composition of Example 1 were sprinkled evenly onto the carpet. After a period of standing of about five minutes, the carpet was vacuumed and 570 grams of residue were collected. Since the composition of Example 1 contained 30% by weight of volatile solvent, the theoretical powder weight of cleaner to be removed was 399 grams. It was therefore calculated that 138 grams of the residue was carpet soil in the form of hair and dirt.

The test demonstrates that the carpet cleaning composition of the present invention was effective in removing carpet soil that vacuuming alone could not remove. Unlike conventional powdered carpet cleaners, the present composition was not worked into the carpet by mechanical or manual scrubbing.

EXAMPLE 4

In order to further demonstrate the carpet cleaning properties imparted by the present invention, a test was conducted in general accordance with the procedure of Example 1.

The test carpet was a white, high density imported wool carpet with a looped pile. The carpet had an oriental pattern at the center and edges and was 18×18 in area. The carpet had been subjected to medium soiling conditions in the test home.

The carpet was pre-vacuumed in accordance with the procedure of Example 1 and 96 grams of soil was collected. Thereafter, the carpet was vacuumed a second time and 25 grams of soil was collected.

Next, 360 grams of the composition of Example 1 was applied to the carpet, permitted to stand for about five minutes and thereafter removed, by vacuuming. There were 409 grams of powder and residue collected.

The theoretical amount of powder to be removed was 252 grams, based on the fact that 30% of the original 360 grams of powder applied would volatize and therefore contribute no net weight to the removed residue. It was therefore calculated that 150 grams of residue in the form of dirt and hair was removed from the carpet. It should be noted that this represents more than 100% of the amount of dirt removed by the pre-treatment vacuuming.

EXAMPLE 5

In order to further demonstrate the nature of the soil resistance properties imparted to carpets treated with the carpet cleaning compositions of the invention, the following test was conducted:

A 15×15 carpet, substantially free from soil, was selected. The carpet was white with brown and gold flecks. The carpet selected was a nylon shag of medium pile.

The carpet was subjected to the pre-treatment vacuuming procedure in Example 1 and thereafter was cleaned with the composition of Example 1. The first pre-treatment vacuuming collected 30 grams of carpet soil. The second pre-treatment vacuuming collected about five grams of carpet soil. Thereafter, 480 grams of powder were applied which would leave theoretically 346 grams of powder to be removed after drying.

There were collected 328 grams of residue from the carpet.

The results demonstrate that the carpet, being relatively clean, did not release soil into the powder. It was calculated that 18 grams of powder, originally applied to the carpet, were not collected. While this amount may be within the experimental error of the test, nevertheless the results tend to show that a very minor amount of the powder remains in the carpet (less than about five percent) to protect against further carpet soiling.

EXAMPLE 6

The following intermediate formulation was prepared by mixing 37.3% of a 3% benagel aqueous system under high shear. After it is well dispersed, the zeolex is added. The balance of the ingredients are then added:

| | |
|---|---|
| Zeolex 23A | 10.0% |
| Disodium Phosphate | 0.5 |
| Ammonium Lauryl Sulfate | 1.0 |
| Monoethanolamine | 0.2 |
| Ammonia (28%) | 0.1 |
| Perfume | 0.1 |
| Montmorillonite (Benagel EW) | 1.1 |
| Deionized Water | 86.8 |
| | 100.0 |

This intermediate was mixed in a 90/10 weight ratio with isobutane and placed in an aerosol container. The product was sprayed on carpeting and vacuumed up showing noticeable cleaning.

COMPARATIVE EXAMPLE 1

In order to demonstrate the comparative cleaning properties between a composition of the present invention and those exemplified in the prior art, comparative tests were conducted as follows:

COMPARATIVE TEST 1

The dry-cleaning compositions of Examples 1 and 2 in U.S. Pat. No. 3,418,243 were prepared. Samples of these compositions as well as a sample of the composition of Example 1 were sprinkled onto a soiled test carpet, allowed to stand and thereafter removed by vacuuming. None of the samples were rubbed into the carpet.

Thereafter, the test carpet was visually inspected. The sample cleaned with the composition of Example 1 was visibly brighter and cleaner than that treated with the prior art samples.

COMPARATIVE TEST 2

The cleaning compositions of Examples A and B illustrated in Column 5 of U.S. Pat. No. 3,827,857 were prepared. In view of the absence of technical information on the properties of the chemicals used in these Examples, it was not known whether or not the test samples were duplicates in all respects of the preparations illustrated in the patent. The ingredients employed, provided samples which were puttys, not powders. Accordingly, the compositions could not be applied by simple sprinking nor could they be removed by simple vacuuming.

COMPARATIVE TEST 3

The compositions of Examples 1, 2 and 3 in Table 1 of U.S. Pat. No. 3,630,919 were prepared and tested against a composition prepared according to Example 1 of the present invention. The prior art compositions were sprinkled onto the test carpet in one series of tests and rubbed into the carpeting in another series of tests in order to evaluate the differences in cleaning imparted by the diverse methods of application. It was found that rubbing the U.S. Pat. No. 3,630,919 compositions into the carpet, rather than sprinkling them onto the carpet, provided only a very slight improvement in cleaning.

The portion of the test carpet cleaned with the composition of the present invention was visibly cleaner and brighter than the portions tested with the composition of Examples 1-3 of the U.S. Pat. No. 3,630,919. The present inventive compositions provided better cleaning, particularly after multiple applications.

Further testing demonstrated that at least 15 percent of the colloidal silica would be required in the U.S. Pat. No. 3,630,919 cleaners in order to impart acceptable no-rub, sprinkle-on, vacuum-off cleaning. However, such amounts present the user with various problems, including the product's tendency to excessively dust upon application.

While various preferred embodiments of the present invention have been illustrated by means of specific examples, it is to be understood that the present invention is in no way to be deemed as limited thereto. The invention should be construed as broadly as any equivalent thereof.

Wherefore, I claim:

1. A particulate textile fiber or fabric cleaning composition, having a high affinity for textile soil normally resistant to vacuum removal and adapted for distribution without dusting to natural or synthetic textile fibers or fabric and for expeditious removal therefrom, which comprises:

(a) from about 5 to 50% by weight of an aqueous volatile solvent in amounts sufficient to control dusting and to provide uniformity in said particulate composition;

(b) from about 10 to 95% by weight of an inert, highly absorbent carrier in sufficient amounts to cooperate in removing textile soil and to form a central wetted core; and (c) from about 15 to 90% by weight of a natural or synthetic aluminosilicate zeolite in sufficient amounts to effectively remove textile fiber or fabric soil, said zeolite formulated to become anchored to said central core to resist dusting.

2. The composition of claim 1 wherein the volatile solvent is from abut 15-30 percent by weight of deionized water and from 3 to 7% by weight of an organic volatile solvent.

3. The composition of claim 1 wherein the absorbent carrier is a cellulose or textile fiber from about 100-140 microns in length and employed in amounts from about 25-40 percent by weight of the composition.

4. The composition of claim 1 in which the zeolite is a synthetic, sodium A zeolite employed in amounts from about 20-50 percent by weight of the composition.

5. The composition of claim 1 including from about 5 to 15 percent by weight of a brightener.

6. The composition of claim 1 wherein the textile fiber is in the form of a carpet or rug.

7. The composition of claim 1 wherein the composition includes from 4 to 30% of a propellent.

8. A process of cleansing which comprises applying to a textile fiber in the form of a carpet or similar surface, the composition of claim 1, allowing the composition to stand for a time sufficient to cleanse the textile fabric and thereafter, removing said composition.

* * * * *